(12) United States Patent
Li et al.

(10) Patent No.: US 8,131,054 B2
(45) Date of Patent: Mar. 6, 2012

(54) COMPUTERIZED IMAGE ANALYSIS FOR ACETIC ACID INDUCED CERVICAL INTRAEPITHELIAL NEOPLASIA

(75) Inventors: Wenjing Li, Honolulu, HI (US); Rolf Holger Wolters, Kailua, HI (US)

(73) Assignee: STI Medical Systems, LLC, La Jolla, CA (US)

( * ) Notice: Subject to any disclaimer, the term of this patent is extended or adjusted under 35 U.S.C. 154(b) by 806 days.

(21) Appl. No.: 12/221,645

(22) Filed: Aug. 4, 2008

(65) Prior Publication Data
US 2009/0034824 A1    Feb. 5, 2009

Related U.S. Application Data

(60) Provisional application No. 60/963,351, filed on Aug. 3, 2007.

(51) Int. Cl.
*G06K 9/00* (2006.01)
(52) U.S. Cl. ........................................................ 382/133
(58) Field of Classification Search .................... 382/133
See application file for complete search history.

(56) References Cited

U.S. PATENT DOCUMENTS

| | | | |
|---|---|---|---|
| 6,902,935 B2 | 6/2005 | Kaufman et al. | |
| 7,260,248 B2* | 8/2007 | Kaufman et al. | 382/128 |
| 7,309,867 B2 | 12/2007 | Costa et al. | |
| 2005/0215858 A1* | 9/2005 | Vail, III | 600/135 |
| 2006/0013454 A1 | 1/2006 | Flewelling et al. | |
| 2006/0228015 A1 | 10/2006 | Brockway et al. | |
| 2008/0240558 A1* | 10/2008 | Li et al. | 382/167 |
| 2009/0046905 A1* | 2/2009 | Lange et al. | 382/128 |

OTHER PUBLICATIONS

Gordon, et al., Image Segmentation of Uterine Cervix Images for Indexing in PACS, Proceedings of the 17th IEEE Symposium on Computer-Based Medical Systems (CBMS'04), 2004.*
Gordon, S., "Content analysis of uterine cervix images . . . ," Proc. of SPIE, vol. 6144, pp. 61444U-1-6144U-8, 2006.
Li, W., "Automated image analysis of uterine cervical images," Proc. SPIE 6514, pp. 65142P-1-65142P-9, 2007.

* cited by examiner

*Primary Examiner* — Rodney Fuller
(74) *Attorney, Agent, or Firm* — Martin E. Hsia

(57) ABSTRACT

A method for differentiating cancerous lesions from surrounding tissue, which includes extracting an opacity parameter from acetowhite regions of pre acetic acid and post acetic acid images of a cervix.

24 Claims, 12 Drawing Sheets

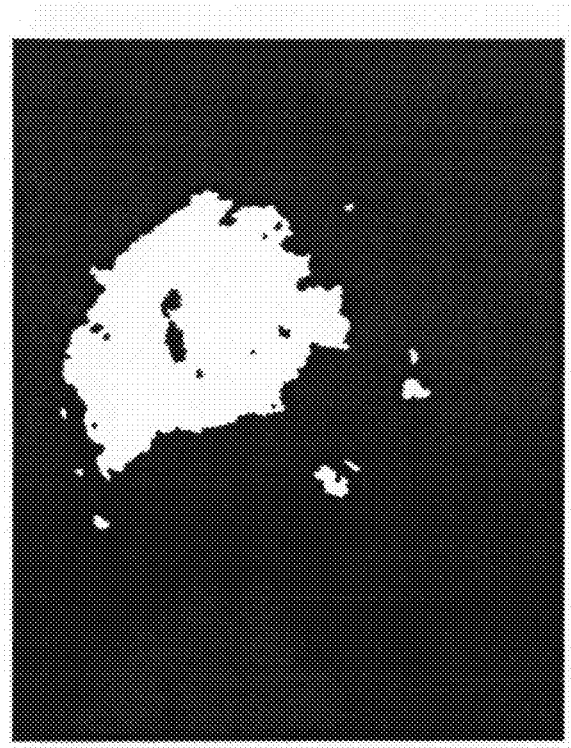
FIG 4(D)(1)
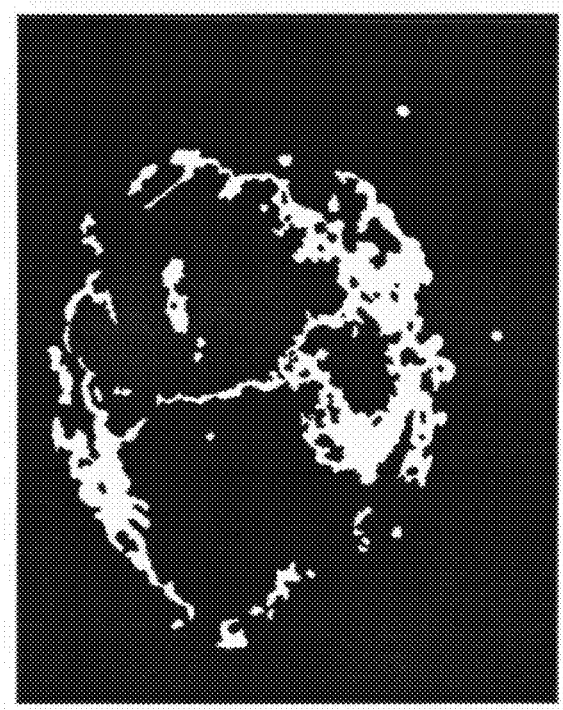
FIG 4(D)(2)

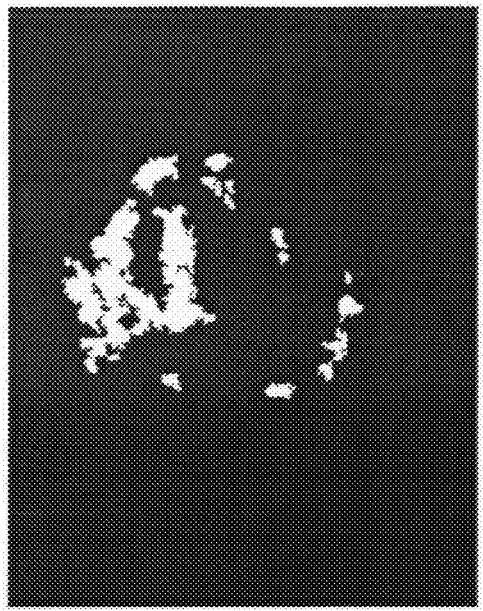
FIG 7(A)(1)        FIG 7(A)(2)
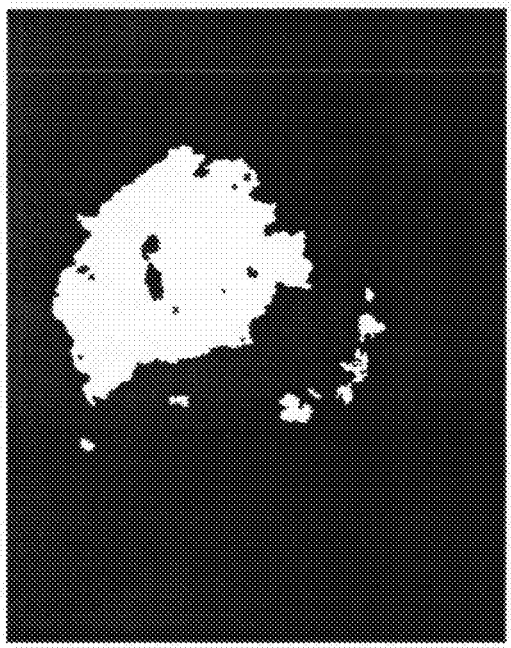
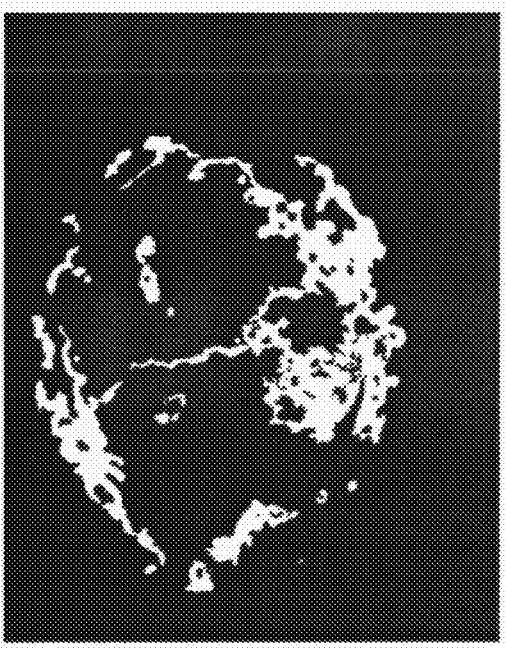
FIG 7(B)(1)        FIG 7(B)(2)

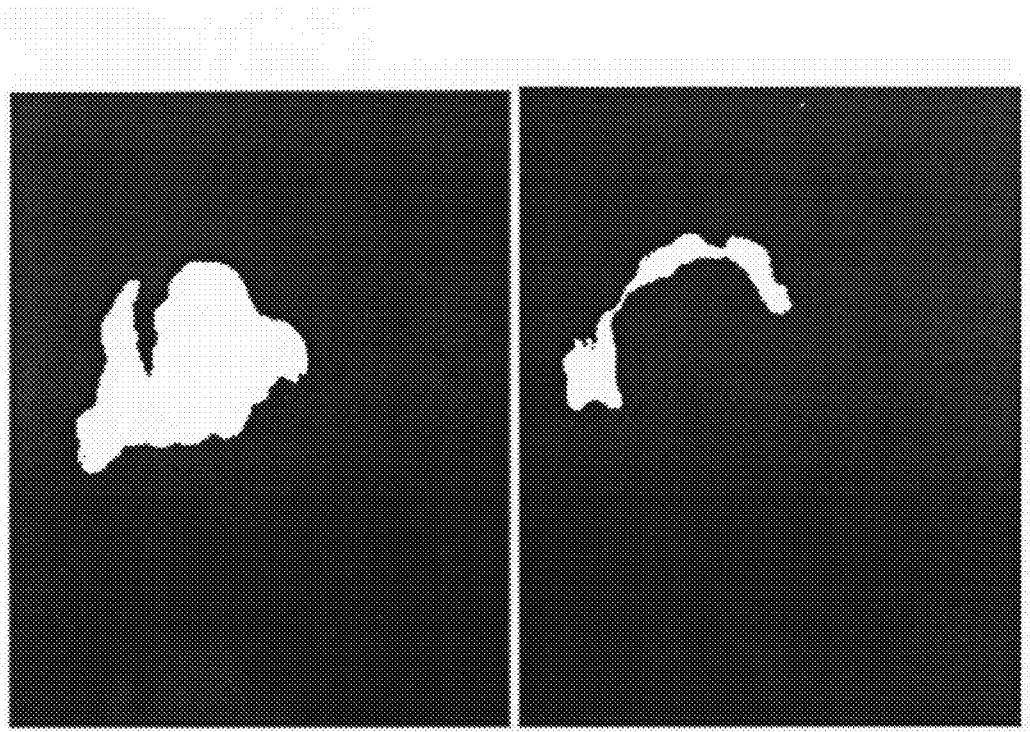
FIG 7(C)(1)  FIG 7(C)(2)
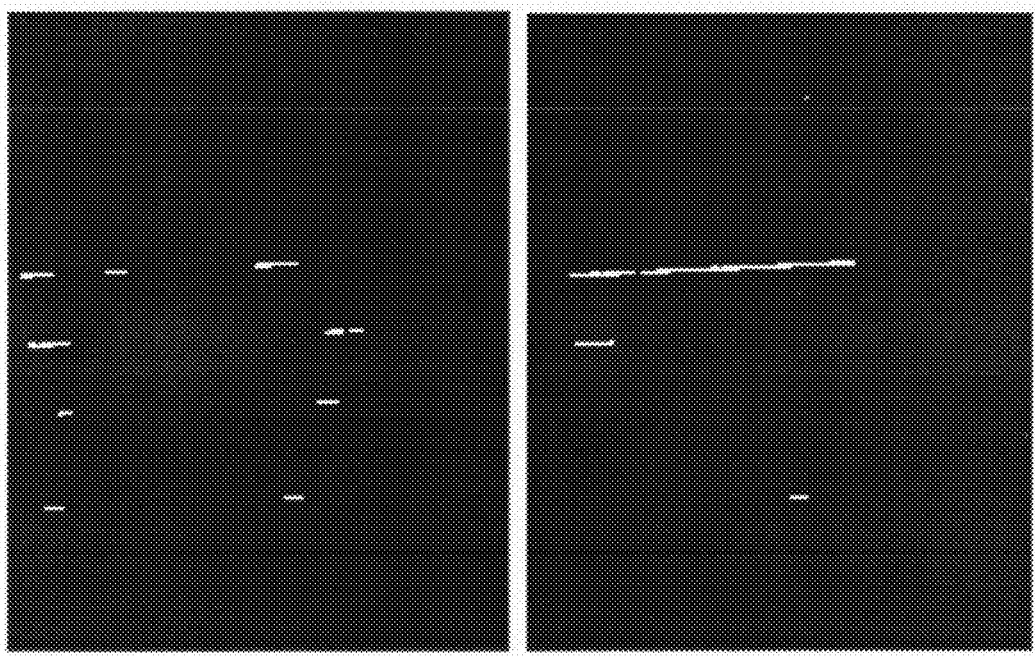
FIG 7(D)(1)  FIG 7(D)(2)

COMPUTERIZED IMAGE ANALYSIS FOR ACETIC ACID INDUCED CERVICAL INTRAEPITHELIAL NEOPLASIA

The present application claims the priority of U.S. provisional patent application 60/963351 filed Aug. 3, 2007, which is incorporated herein by reference.

This invention was made with partial government support under US Army Medical Research and Material Command under Contract No. W81XWH-07-C-0006. The US government has certain rights in the invention.

TECHNICAL FIELD

This invention generally relates to medical imaging and image processing. The invention relates more specifically to the computer aided diagnosis of uterine cervical cancer through the evaluation of acetowhite regions and extraction of an opacity parameter.

BACKGROUND ART

Although this invention is being disclosed in connection with cervical cancer, it is applicable to many other areas of medicine. Uterine cervical cancer is the second most common cancer in women worldwide, with nearly 500,000 new cases and over 270,000 deaths annually (LARC, "Globocan 2002 database, "International agency for research in cancer, 2002, incorporated herein by reference). Because invasive disease is preceded by pre-malignant Cervical Intraepithelial Neoplasia (CIN), if detected early and treated adequately, cervical cancer can be universally prevented (D. G. Ferris, J. T. Cox, D. M. O'Connor, V. C. Wright, and J. Foerster, *Modern Colposcopy, Textbook and Atlas*, pp. 1-699, American Society for Colposcopy and Cervical Pathology, 2004, incorporated herein by reference). The pre cancerous epithelium is usually categorized as CIN grades 1, 2, and 3 or histologically low-grade and high-grade squamous intraepithelial lesions (LSIL and HSIL), depending on the severity of the lesions.

After an abnormal pap smear, colposcopy is the primary diagnostic tool for identifying the most atypical sites of the cervix for a biopsy. Cervical precursor lesions (Cervical neoplasias) exhibit certain morphologic features (features of form and structure) that can be identified during a colposcopic examination (D. G. Ferris, J. T. Cox, D. M. O'Connor, V. C. Wright, and J. Foerster, *Modern Colposcopy. Textbook and Atlas*, pp. 1-699, American Society for Colposcopy and Cervical Pathology, 2004, incorporated herein by reference). In particular, Cervical Intraepithelial Neoplasia (CIN), the abnormal growth of potential precancerous cells in the cervix, exhibits certain morphologic features that can be identified during a colposcopic exam. These features include distinct epithelial (membrane) and vascular (blood vessel) abnormalities.

The colposcopic examination is performed with high magnification, a bright light source and acetic acid. Cervical patterns are interpreted by clinically standardized criteria. The colposcopic examination determines the location of the most severe dysplastic (potentially cancerous) region for biopsy purposes. Dysplasia is a pathology term that is used to refer to the abnormal maturation of cells within a tissue. Metaplasia is a pathology term that is used to refer to the abnormal replacement of cells of one type by cells of another.

A fundamental part of the colposcopic exam is the use of acetic acid (vinegar). Potential precancerous epithelial cells in the cervix, such as immature metaplastic and dysplastic cervical squamous (having an outer layer of scale-like cells) epithelia, turn white after the application of acetic acid during an examination, to create acetowhite regions. Virtually all cervical cancer lesions become a transient and opaque white color following the application of 5% acetic acid. The whitening process (acetowhitening) occurs visually over several minutes and subjectively discriminates between dysphasic and normal tissue. An acetowhite region is one of the major colposcopic signs observed in cervical cancer. The spatial location and temporal changes of acetowhite regions are the major visual diagnostic indicators in the exam, and are usually interpreted by a trained colposcopist based upon prior experience. However, blood vessels do not turn white after application of acetic acid and therefore still appear red, even though they are in abnormal tissue that has become white, so that blood vessels may mask acetowhitening.

Further, some lesions do not have visible blood vessels, and some normal regions are naturally white, or turn white after application of acetic acid, so reliance solely on acetowhitening leads to substantial amounts of false positive results.

Due to the subjective nature of a colposcopic examination, the accuracy of colposcopy is highly dependent upon colposcopists' experience and expertise. It has been estimated that approximately one third of high grade disease is missed by initial colposcopy, so that there are also substantial amounts of false negative results (T. Cox, M. Schiffnan, and D. Solomon, "Prospective follow-up suggests similar risk of subsequent cervical intraepithelial neoplasia grade 2 or 3 among women with cervical intraepithelial neoplasia grade 1 or negative colposcopy and directed biopsy", *American Journal of Obstetrics and Gynecology,* 188, pp. 1406-1412, 2003, incorporated herein by reference). The advent of digitized medical images has led to an increasingly important and evolving role for image processing and computer-aided diagnostic (CAD) systems. An automated image analysis system that identifies and analyzes diagnostic features in uterine cervical images is desirable, and could provide a clinical diagnosis by following an objective and quantifiable process, which together with the subjective judgment of a colposcopist, could increase accuracy and reduce false positives and false negatives.

Digital imaging technologies could assist physicians in analyzing the acetic acid induced lesions (acetowhite regions) in a fully automatic and objective way. However, automated detection of acetowhite epithelial depicted on cervical images has been a challenging task due to light reflection, varying amounts of illumination and wide inter- and intra-patient variation. There is also the problem of false positives, because, as noted above, human cervical tissue may naturally be white in some patients and thus may look like an acetowhite lesion. False positives are also derived from imperfect registration (alignment) of pre and post acetic acid images. It is a goal of the present invention to increase the accuracy of, and reduce the incidence of false positives (and false negatives) in, colposcopic examinations.

It is therefore an object of the present invention to provide computer aided cervical cancer diagnosis using image processing algorithms for automatic objective diagnosis. It is another object of the present invention to find numeric measurements which can be quantitatively correlated to lesion stage, and thereby provide higher predictive value for the presence of cancer.

The following patents and patent applications may be considered relevant to the field of the invention:

U.S. Pat. No. 6,902,935 to Kaufman et al., incorporated herein by reference, provides methods and systems for monitoring effects of chemical agents on optical signals produced by a sample in response to chemical agents.

U.S. Pat. No. 7,260,248 to Kaufman et al, incorporated herein by reference, discloses methods of relating a plurality of images that are used in the segmentation of a sequence of colposcopic images. The methods are applied to determine tissue characteristics in acetowhitening testing of cervical cancer.

U.S. Pat. No. 7,309,867 to Costa et al., incorporated herein by reference, discloses methods for determining the probability that a given region of tissue sample contains tissue of a given category, such as cervical intraepithelial neoplasia, grades 1, 2, and/or 3.

U.S. Patent Application No. 2006/0228015 to Brockway et al., incorporated herein by reference, discloses a method for processing an image of a region of interest to detect abnormalities such as lesions by analyzing spatial information, feature templates, morphology parameters, and intensity parameters that vary over time.

DISCLOSURE OF THE INVENTION

The present invention comprises: applying acetic acid to an anatomic region of interest to produce acetowhite regions; taking at least one post acetic acid image of the acetowhite regions; detecting an anatomic region of interest having epithelial cells; extracting texture information from the post acetic acid image to define a texture region; extracting color information from the post acetic acid image to define a color region; and combining the texture region and the color region to create a candidate acetowhite region.

Preferably, the method also comprises: obtaining at least one pre acetic acid image of the epithelial cells; registering the acetowhite regions in one of the pre acetic acid images and in one of the post acetic acid images to form registered images of the acetowhite regions; and extracting an opacity parameter from the registered images of the acetowhite regions.

Thus, the present invention discloses methods of measuring multiple parameters of the acetowhitening process from at least two images captured with a digital imager (such as a colposcope). Preferably, one image is captured before the acetic acid application (pre acetic acid image), and at least one other is captured after the acetic acid application (post acetic acid image). A sequence of image processing algorithms is then used to analyze the anatomic properties of the cervix, extract the color, texture and opacity properties of the acetowhite epithelium, and locate acetowhite lesions. Two different approaches can be used for determining the extent of an acetowhite region. One approach is based on extracting the spatial extent of acetowhitening from the post-acetic acid image, without reference to the pre-acetic acid image, by extracting color and texture information in the post acetic acid image. The second approach is to extract temporal changes of the lesions or epithelial cells by registering pre-acetic acid images and post-acetic acid images, and subtracting the registered images. Opacity parameters indicating lesion severity are extracted from the registered images based on the difference of color changes.

A textured region is identified in the original image by determining regions within the image with high variations in color and intensity (brightness). Texture analysis attempts to quantify rough, smooth, silky, or bumpy as a function of the spatial intensity variations in the image (the spatial extent of variations in brightness (or intensity) of the image, preferably measured by using variations in brightness in a black and white version of the image, or "grayscale"). Thus, roughness or bumpiness can be understood as the spatial extent of variations in intensity values, or gray levels, in a black and white version of the image. For the cervix, the texture region is referred to as the region which is rich in texture content or, in other words, has high variations in intensity (instead of being smooth in intensity). Rich texture content indicates blood vessels (which do not change with acetowhitening) combined with acetowhitening of underlying tissue. The cervical texture region is associated with both diseased findings, such as abnormal blood vessel structures, and normal findings, such as immature metaplasia. If cervical blood vessel patterns are not located within these fields of rich texture, pre-cancerous lesions are less likely. Thus, by detecting the texture regions, and only applying visual enhancement algorithms to these areas, only blood vessel patterns associated with pre-cancerous or cancerous lesions will be visually enhanced. This invention provides the means for controllable contrast enhancement and, with segmentation, controllable local contrast enhancement.

These and other features and advantages of this invention are described in or are apparent from the following detailed description of the presently preferred embodiments.

BRIEF DESCRIPTION OF DRAWINGS

The presently preferred embodiments of this invention will be described with reference to the following figures, wherein:

FIG. 2(A) is an example of an input image of the cervix; FIG. 2(B) is an example of the detected cervix region from the input image using the cervix region detection algorithm; FIG. 2(C) is an example of the detected cervical os region of the input image using the os detection algorithm; and FIG. 2(D) depicts the columnar epithelium found with the columnar detection algorithm.

FIG. 3(A) is a two-peak histogram obtained for the homogenous cervical tissue for the input image in FIG. 2(A). FIG. 3($b$) depicts the segmentation of the homogenous tissue for the input image in FIG. 2(A) into an acetowhite region (gray) and a mature squamous region (white) using color information.

FIG. 5(A) is an example of pre acetic acid image, FIG. 5(B) is an example of a post acetic acid image, FIG. 5(C) is a registered pre acetic acid image, registered (aligned) with the post acetic acid image of FIG. 5(B), and FIG. 5(D) is the display of soft tissue movement after translation FIG. 6(A) shows the difference of the two registered images in the G channel of RGB color space, and FIG. 6(B) shows the difference of the two registered images in a channel of CIE-Lab color space.

FIG. 7(A)(1) and FIG. 7(A)(2) are both results of the opacity analysis. FIG. 7(A)(1) shows the most opaque white lesion and FIG. 7(A)(2) shows the intermediate opaque white lesion. FIG. 7(B)(1) and FIG. 7(B)(2) are the results of final acetowhite epithelium detection. FIG. 7(B)(1) depicts the first level of acetowhite region and FIG. 7(B)(2) depicts the second level of acetowhite region. FIG. 7(C)(1) shows the colposcopist's image annotation of the opaque white lesion and FIG. 7(C)(2) shows the colposcopist's image annotation of the intermediate opaque white lesion. FIG. 7(D)(1) and FIG. 7(D)(2) are histological maps of the cervical images. The lines in FIG. 7(D)(1) denote HSIL (high-grade squamous intraepithelial lesion) and the lines in FIG. 7(D)(2) denote LSIL (low-grade squamous intraepithelial lesion).

BEST MODE FOR CARRYING OUT THE INVENTION

Figure 1:
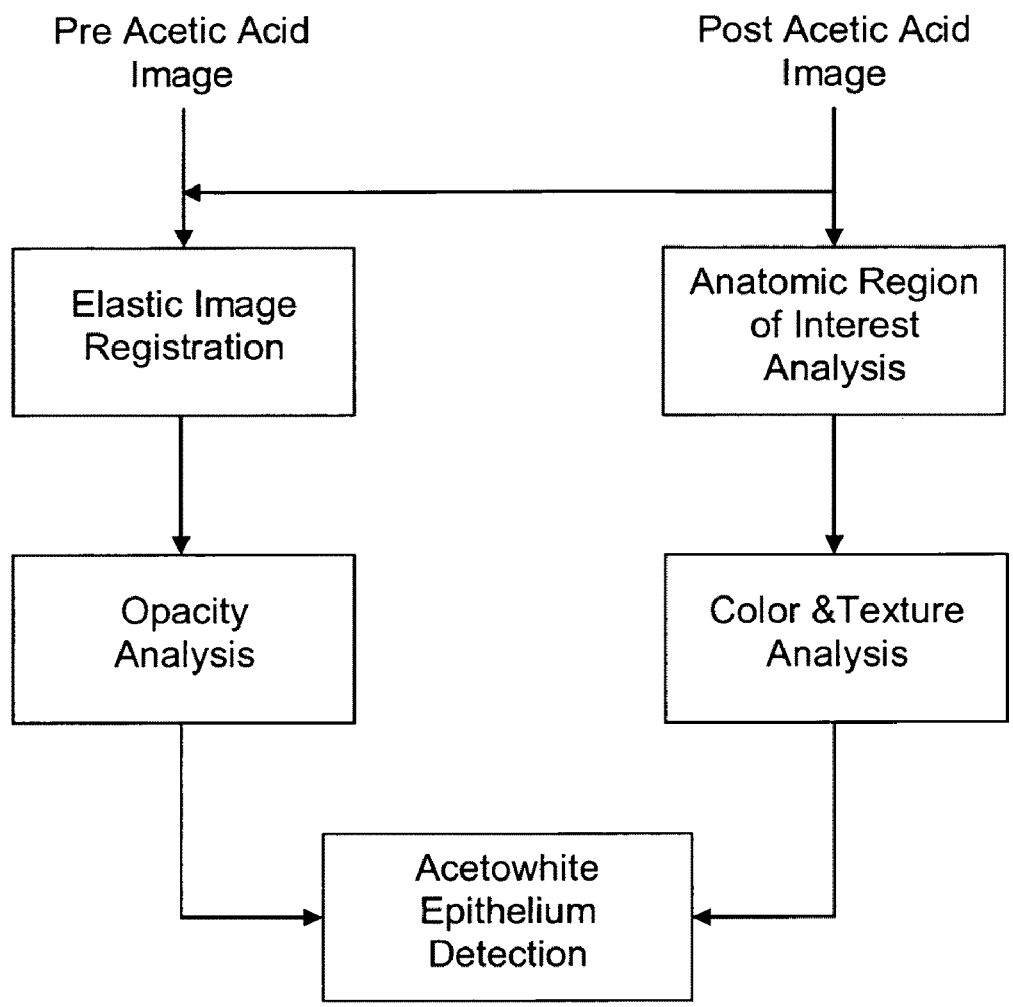
FIG. 1 depicts a block diagram of the multi-step procedure of analyzing the acetowhite epithelium using a set of image processing algorithms.

The present invention described herein and more fully below, comprises an automated image analysis system for quickly and efficiently detecting acetic acid induced intraepithelial lesions from surrounding tissue, and to characterize both color and opacity properties of acetowhite epithelium. FIG. 1 depicts a block diagram of the multi-step procedure of analyzing the acetowhite epithelium using a set of image processing algorithms.

1. Obtaining Pre Acetic Acid and Post Acetic Acid Images of the Cervix

Images of the cervix, before and after acetic acid application, are required. The images could, be images from a digital imager, such as a digital colposcope, or they could be digitized copies of film or other images. Prior to application of acetic acid (preferably 5% acetic acid), polarized and non-polarized high-resolution digital color images of the cervix are taken with a digital imager (colposcope). The post acetic acid image is considered to be the reference image.

The present invention preferably uses a colposcope capable of high-resolution digital imagery with stereoscopic imaging capabilities, for three-dimensional image reconstruction, and cross-polarized image acquisition, to reduce specular reflections or glint (glint is undesirable because it can be misinterpreted as acetowhite epithelium).

For example, STI Medical developed a digital colposcope to acquire images with a resolution sufficient for vessel detection. The digital colposcope, utilizes a standard colposcope (Seiler, Series 935), two high-resolution 14 Megapixels digital cameras (Kodak, DCS Pro SLR/n), and a fiber guided light source assembly (Perkin Elmer, DiX1765 Xenon lamp). In addition to high-resolution imaging capabilities, the digital colposcope includes stereoscopic imaging capabilities and cross-polarized image acquisition. An important feature of STI Medical's digital colposcope is the use of cross-polarization to suppress glint.

A calibration unit preferably is also part of the STI's digital colposcope and is used to acquire calibration data at clinic sites. The calibration is preferably performed daily before subject examinations. The purpose of calibration is to ensure that images acquired at different times, and with different imagers or colposcopes, exhibit identical intensity and color values, independent of camera, camera settings and light source used. This can be achieved by mapping the color appearance of the image taken with different instruments into a standard color space (W. Li, M. Soto-Thompson, and U. Gustafsson, "A new image calibration system in digital colposcopy", *Optics Express,* 26, pp. 12887-12901, December 2006, incorporated herein by reference)(a color space is a manner of representing a color as the relative proportions of certain specified color components—red, green and blue ("RGB") is one color space, and cyan, magenta, yellow and key (black) ("CMYK") is another color space, but there are other color spaces that use different color components).

2. Image Analysis

The presently preferred embodiment of the invention is an automated image analysis system to identify unique cervical features with the present goal of reducing false positives and to identify normal cervical anatomy and then acetowhite epithelium. Images taken before and after an acetic acid application are required to characterize both the color and opacity properties of acetowhite epithelium. A multi-step procedure (FIG. 1) has been utilized to analyze the acetowhite epithelium using a set of image processing algorithms.

a. Anatomic Region of Interest Analysis

Before performing any image processing, the region of interest (cervix) needs to be discerned from surrounding tissue (such as the vaginal wall). The main challenge in finding the cervix region is that its texture and color mimic those of the surrounding tissue. The anatomic region of interest analysis is a fully automated procedure that utilizes a cervix region detection algorithm, an os region detection algorithm, and columnar detection algorithm to detect the cervix, os, and columnar epithelium, in that sequential order. Further, the magnification level of the colposcope preferably is selected such that the cervical image also contains the edge of the speculum and the vaginal wall.

To detect the region of interest, the present invention preferably uses an unsupervised two-class clustering technique based on GMM (Gaussian Mixture Model). Clustering refers to the classification of image attributes (including texture, shape, and size) into different groups, or clusters, such that the data in each cluster share a common trait. Unlike previous work (S. Gordon, G. Zimmerman, R. Long, S. Antani, J. Jeronimo, and H. Greenspan, "Content analysis of uterine cervix images: initial steps towards content based indexing and retrieval of cervigrams", in *Proc. SPIE,* 6144, pp. 1549-1556, 2006, incorporated herein by reference), the present invention preferably does not assume that the cervix region is located in the center of the image. However, any image segmentation algorithm may be used.

i. The Cervix Region Detection Algorithm

Figure 2A:
FIG. 2(A), FIG. 2(B), FIG. 2(C), and FIG. 2(D) depict an example of extracting anatomic properties of cervical images.
Figure 2B:
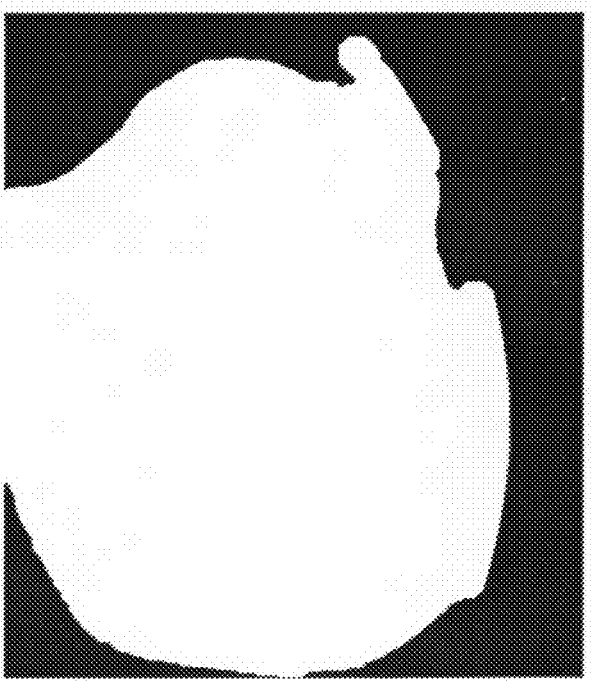

The cervix region detection algorithm is preferably performed in the following steps. First, a Gaussian low-pass filter is applied to the RGB image of the cervix to remove noise. Second, the Karhumen-Loeve (K-L) transformation is used to transform the image from RGB color space into K-L space. The K-L space has proven to be the best space for color-texture characterization for the analysis of skin lesions (G. Van de Wouwer, P. Scheunders, S. Livens, and D. Van Dyck, "Wavelet correlation signatures for color texture characterization", *Pattern Recognition,* 32, pp. 443-451, 1999, incorporated herein by reference) and colon tumor detection (S. A. Karkanis, D. K. Iakovidis, D. E. Maroulis, D. A. Karras, and M. Tzivras, "Computer-aided tumor detection in endoscopic video using color wavelet features", *IEEE Trans. Inf. Technol. Biomed.,* 7, pp. 141-152, 2003, incorporated herein by reference). Third, the Expectation Maximization (EM) algorithm is used to cluster the $K_1$ channel (the eigenvector corresponding to the largest eigenvalue during eigen-decomposition) as foreground and background. Fourth, within the foreground region, the vaginal folds are detected using color and gradient information and then curves are fitted using the detected data points to extend the vaginal folds to the foreground boundary. The vaginal regions are defined as the cutout areas from the foreground region using the fitted curves (S. Venkataraman and W. Li, "Improving cervical region of interest by eliminating vaginal walls and cotton swabs for automated image analysis", in *Proc. of SPIE, Medical Imaging* 2008, 2008, incorporated herein by reference). FIG. 2(B) shows the cervix region detected by the proposed cervix detection algorithm given by the input image in FIG. 2(A).

ii. The Os Detection Algorithm

The cervical os defines the portion of the cervical canal covered by the columnar epithelium. If visible, it is usually a small-area region located in the center of the cervix with low intensity, surrounded by the columnar epithelium and the transformation zone (TZ). The os region detection algorithm is based on mean shift clustering, given the assumption that the os region is probably located in the center portion of the detected cervical region with the lowest intensity, and not simply located in the image center. The mean shift algorithm is a nonparametric clustering technique which does not require prior knowledge of the number of clusters, and does not constrain the shape of the clusters. It is based on kernel density gradient estimation theory and is guaranteed to converge to a point where the gradient of density function is zero. More details about the mean shift algorithm can be found in the paper by Comaniciu et al (D. Comaniciu and P. Meer, "Mean shift: a robust approach toward feature space analysis", *IEEE Transactions on Pattern Analysis and Machine Intelligence*, 24, pp. 603-619, May 2002, incorporated herein by reference).

Figure 2C:
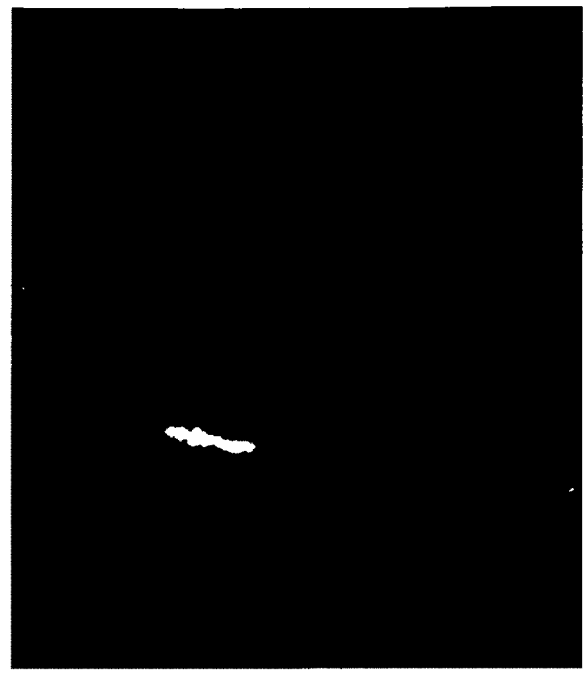

The os detection algorithm is applied to the cervix region only and starts by computing a distance transform in order to create a distance image. The distances used are based on Euclidean metrics. The purpose of the distance image is to locate the center portion of the cervical region. In the second step, mean shift clustering is applied to a pre-selected search range of the $K_1$ channel of the image. The cervical os region is then obtained by selecting the cluster with lowest intensity, followed by morphological operations to remove small noisy regions. In order to improve the robustness of the os detection, the os detection is run using three different search range parameters, which are preferably pre-selected as ¼, ½, and ¾ of the cervix region area. The final os region is the os region with maximal area values. FIG. 2(C) shows the detected cervical os region of the input image in FIG. 2(A).

iii. The Columnar Detection Algorithm

Figure 2D:

The columnar region appears reddish even after application of acetic acid. This color information is crucial in segmenting the columnar region. The columnar detection algorithm applies the mean shift algorithm using the color information in CIE-Luv color space to segment the columnar region. The columnar epithelium detected for the image in FIG. 2(A) can be seen in FIG. 2(D).

3. Acetowhite Color Analysis

Figure 4A:
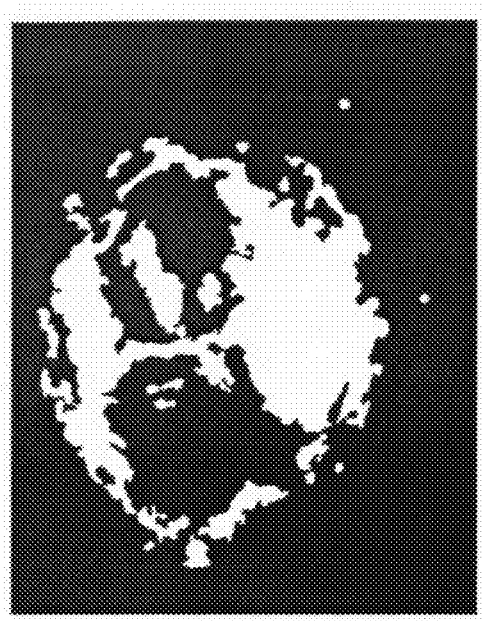
FIG. 4(A) shows a binary map of the texture region.

Using at least one post acetic acid image, acetowhite epithelium is preferably assessed by its visual appearance characteristics with respect to color and texture. Both attributes play important roles in identifying the acetowhite epithelium. Texture analysis is preferably performed using the raw image as input. To perform a color analysis of the acetowhite region, the corresponding intensity and color calibrated image (as described in W. Li, M. Soto-Thompson, and U. Gustafsson, "A new image calibration system in digital colposcopy", *Optics Express*, 26, pp. 12887-12901, December 2006, incorporated herein by reference) is used as input for the acetowhite color analysis. Spatial analysis of the color and texture properties of acetowhite lesions is preferably performed in the following steps a. Texture Region Extraction First a region of the cervix is obtained that excludes the os region and columnar epithelium regions. Texture features such as polarity, anisotropy and normalized texture contrast are extracted, preferably using a technique presented by Carson et al (C. Carson, S. Belongie, H. Greenspan, and J. Malik, "Blobworld: image segmentation using expectation-maximization and its application to image querying", *IEEE Transactions on Pattern Analysis and Machine Intelligence*, 24, pp. 1026-1038, August 2002, incorporated by reference). Preferably, regions exhibiting a high degree of texture independent of the color information are extracted. The texture region is then obtained by applying a two-class clustering algorithm in the texture feature space. The texture region detected for the cervical image in FIG. 2(A) is shown in FIG. 4(A) as bright regions.

b. Color Region Extraction

Figure 3A:
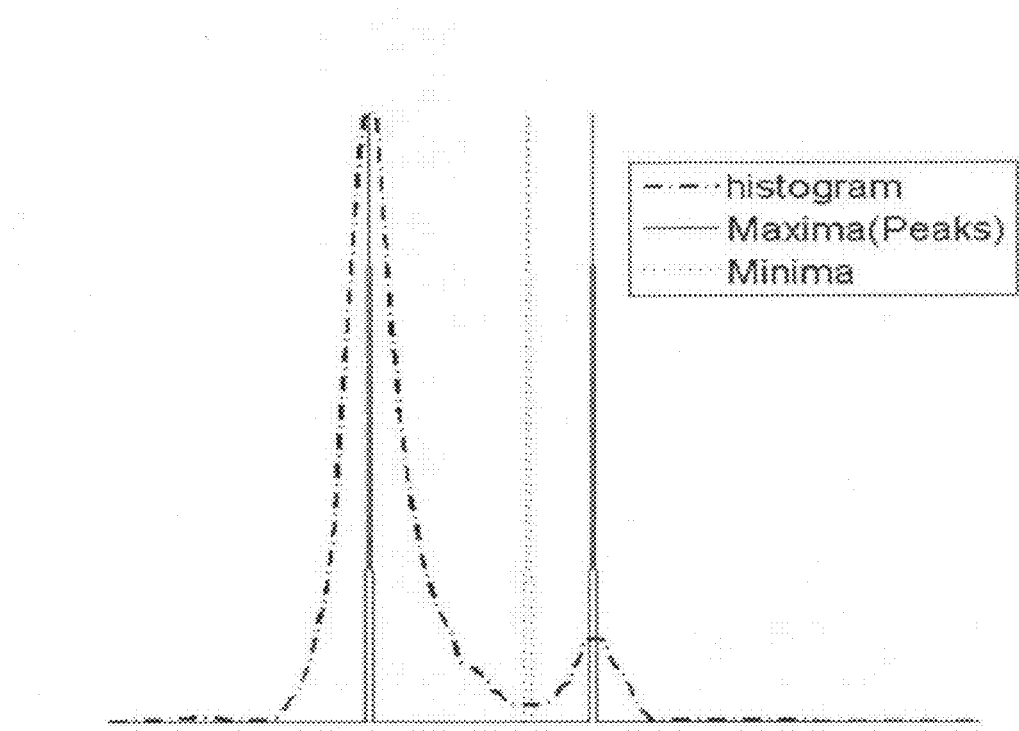
FIG. 3(A) and FIG. 3(B) depict acetowhite color region extraction.
Figure 3B:
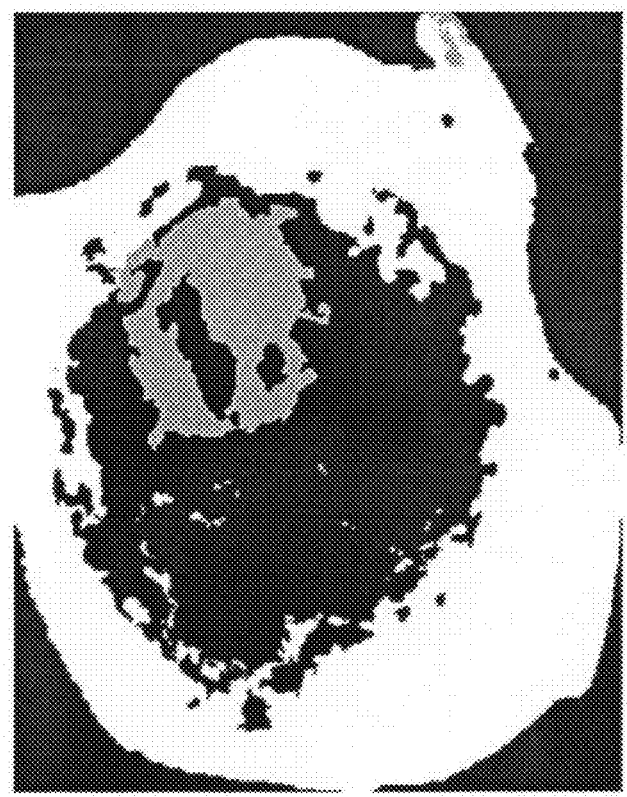

Color is the major image property used to distinguish acetic acid induced lesions (white) from normal epithelium (which appears pinkish in cervical images). This second step focuses on color information only, and the region of interest is the cervix region (excluding the os region, the columnar epithelium region, and the texture region determined in the previous step). This region of interest exhibits a near homogenous surface and usually consists of normal epithelium and/or an acetowhite region. The present invention preferably extracts the acetowhite lesions from the normal epithelium utilizing a method based on the number of dominant peaks of the RGB G channel histogram as previously described by Li et al (W. Li, J. Gu, D. Ferris, and A. Poirson, "Automated image analysis of uterine cervical images", in *Proc. of SPIE Medical Imaging* 2007, 6514, 2007, incorporated herein by reference). A one-peak histogram is indicative of a small acetowhite region, whereas a two-peak histogram indicates a large homogeneous acetowhite region. Segmentation of the region of interest is preferably accomplished by the mean shift clustering algorithm for a one-peak histogram and by the Expectation Maximum (EM) algorithm for a two-peak histogram. For the input image in FIG. 2(A), a two-peak histogram was obtained for the homogenous cervical tissue as shown in FIG. 3(A), and the acetowhite color region was then segmented as shown in FIG. 3(B) (gray region).

c. Combining Color Regions and Texture Regions

Figure 4B:
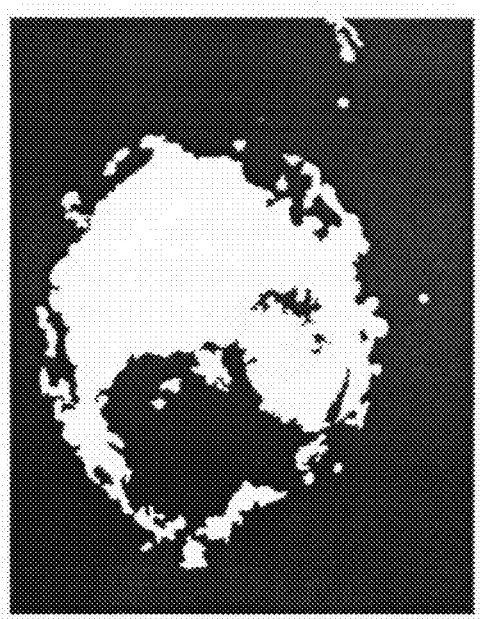
FIG. 4(B) shows a binary map of the combined texture and acetowhite color regions.

By combining the color and texture information obtained above, a candidate acetowhite region is located, as illustrated in FIG. 4(B). This entire color and texture region is preferably further analyzed based on its color properties using the CIE-Lab color space due to its perceptual uniformity. Perceptual uniformity has been considered to describe how the human eyes perceive color (G. Paschos, "Perceptually uniform color spaces for color texture analysis: an empirical evaluation", *IEEE Transactions of Image processing*, 10, pp. 932-936, June 2001, incorporated herein by reference). The three parameters in the CIE-Lab space represent the luminance of the color (L), its position between red and green (a) and its position between yellow and blue (b).

Preferably, a three-class K-means cluster algorithm then classifies the candidate acetowhite region using a color score into three different levels of whitish regions:

$$\text{score}(i) = \begin{cases} (a_i - a_{sq})^2 + (b_i - b_{sq})^2, & \text{if } a_i \le a_{sq} \\ -[(a_i - a_{sq})^2 + (b_i - b_{sq})^2], & \text{if } a_i > a_{sq} \end{cases} \quad (1)$$

where $a_i$ and $b_i$ indicate the average values of the a and b channels, respectively, in CIE-Lab color space for the corresponding whitish region i (=1, 2 3), and $a_{sq}$ is the mean a channel value of the mature squamous epithelium region in the image. The mature squamous epithelium region is obtained by excluding the os, columnar epithelium, and the combined texture and color region from the cervix region. The higher the color score, the whiter the region appears.

Figure 4C:
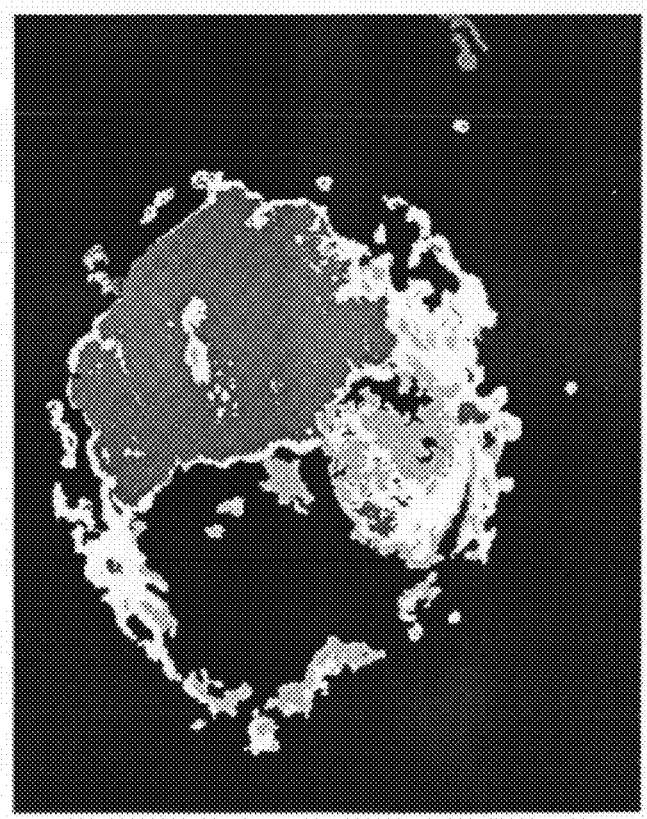
FIG. 4(C) depicts the automatic three-level clustering using color information, FIG. 4(D)(1) shows the level 1 of acetowhite color region detection, FIG. 4(D)(2) shows the level 2 of acetowhite color region detection.

FIG. 4(A) shows a binary map of the texture region, FIG. 4(B) shows a binary map of the combined texture and acetowhite color regions, FIG. 4(C) depicts the automatic three-level clustering using color information, FIG. 4(D)(1) shows the level 1 of acetowhite color region detection, FIG. 4(D)(2) shows the level 2 of acetowhite color region detection.

4. Elastic Image Registration

In colposcopy, acetowhite epithelium refers to epithelium that transiently changes color from pink or red to white after the application of acetic acid. One limitation of the color analysis of the post acetic acid image is that the color property of the tissue can only be assessed spatially. To determine how much the color and intensity changes by the acetic acid application, the present invention preferably also analyzes the image of the cervix acquired before applying acetic acid (pre acetic acid image).

An important step prior to the opacity analysis (described below) is to align, or register, the pre and post acetic acid images. The present invention preferably includes a robust and fully automated elastic registration algorithm to register the pre and post acetic acid images. The problem is formulated as an optimization over a set of continuous deformation vector fields.

$$h^* = \arg\min_h (J(f,g,h)) \quad (2)$$

$$J(f,g,h) = J_D(f,g,h) + \alpha J_R(h) \quad (3)$$

Where $h^*$ the optimal solution and f and g are the images to be registered, $J_D$ is a cost function measuring the dissimilarity between the images. $J_R$ is a regularization term and $\alpha$ is proportionality constant determining how much regularization is used.

The similarity is based on the normalized sum of the squared differences between the acetic acid image g and the pre acetic acid image f, deformed by h.

$$J_D(h, f, g) = \sum_{i,j} (f(h(i, j) + [i, j]) - g(i, j))^2 \quad (4)$$

The regularization criterion $J_R$ penalizes un-smooth deformations. $J_R$ is chosen so that its gradient coincides with the linearized 2D elastic operator describing equilibrium in an elastic material.

$$\nabla J_R(h) = \xi \Delta h + (1-\xi)\nabla(\nabla \cdot h) \quad (5)$$

The $\xi$ is a constant in the range of [0, 1]. By adding the regularization criterion to the global cost function, the image is modeled as an elastic sheet that tries to retain its form in the presence of an external force. The $J_R$ can be expressed in the following discrete form $$J_R(h) = \sum_{i,j} \left[ \xi(\Delta_1 h^1_{i,j})^2 + (1-\xi)\left((\Delta_1 h^1_{i,j})^2 + (\Delta_2 h^1_{i,j})^2\right) \right]$$
$$+ \left[ \xi(\Delta_2 h^2_{i,j})^2 + (1-\xi)\left((\Delta_2 h^2_{i,j})^2 + (\Delta_1 h^2_{i,j})^2\right) \right] \quad (6)$$

where $$\Delta_1 h_{i,j}{}^k = h_{i,j}{}^k - h_{i-1,j}{}^k, \Delta_2 h_{i,j}{}^k = h_{i,j}{}^k - h_{i,j-1}{}^k \quad (7)$$

The initial transformation is assumed to be translation only. The translation vectors are calculated using the normalized two-dimensional cross-correlation. The method of gradient descent with adaptive step size is for optimization. To speed up the transformation process, the multi-resolution scheme is employed.

Figure 5A:
FIG. 5(A), FIG. 5(B), FIG. 5(C), and FIG. 5(D) show elastic image registration.
Figure 5B:
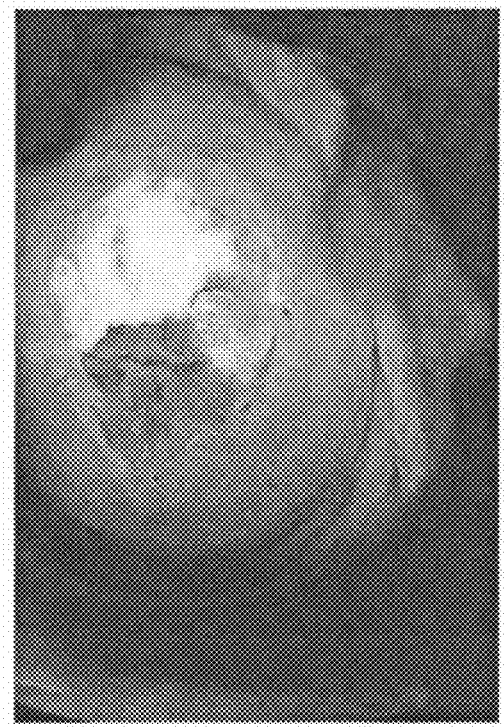
Figure 5C:
Figure 5D:
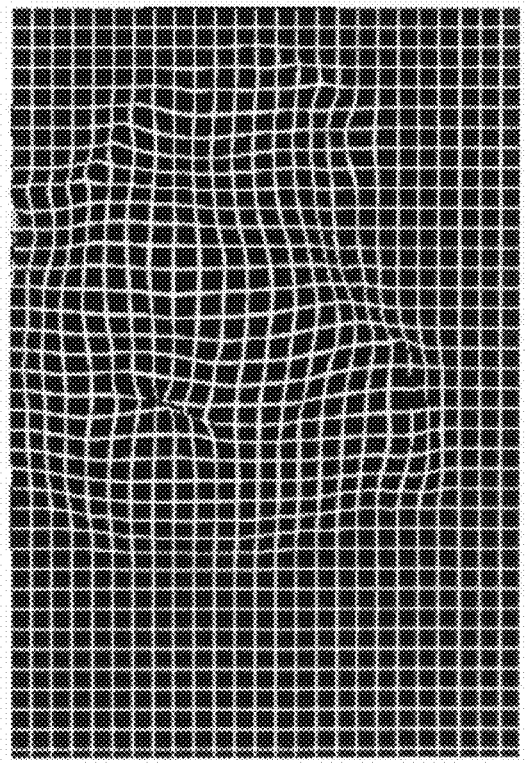

FIG. 5(A), FIG. 5(B), FIG. 5(C), and FIG. 5(D) show elastic image registration. FIG. 5(A) is an example of pre acetic acid image, FIG. 5(B) is an example of a post acetic acid image, FIG. 5(C) is a registered pre acetic acid image, registered (aligned) with the post acetic acid image of FIG. 5(B), and FIG. 5(D) is the display of soft tissue movement after translation.

5. Acetowhite Opacity Analysis

After image registration (alignment), the acetic acid induced changes can be captured by subtracting the registered pre acetic acid image from the post acetic acid image. The presently preferred embodiment of the invention creates an opacity parameter by clustering the differences in temporal changes between the registered pre and post acetic acid images. The opacity parameter provides high predictive value for lesion diagnosis—normal and low grade lesions have much lower opacity than high grade lesions and cancer cases. Other opacity parameter extraction methods can also be used, including ratio imaging in different color spaces.

Figure 6A:
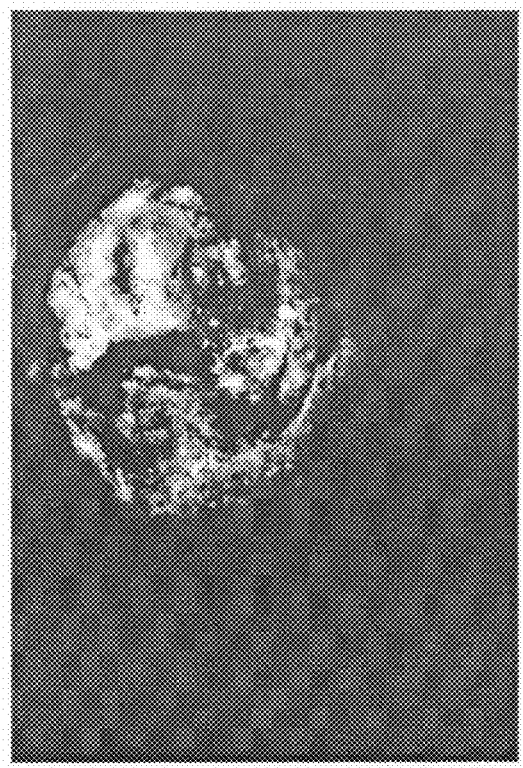
FIG. 6(A) and FIG. 6(B) depict the results of the acetowhite opacity analysis.
Figure 6B:
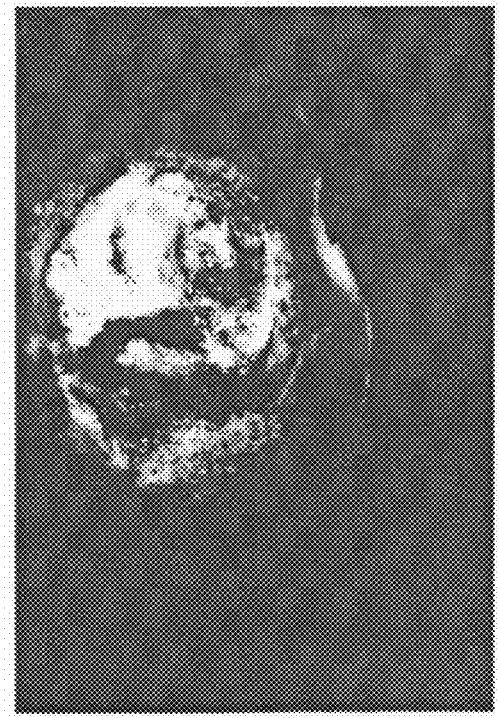

In one preferred embodiment of the invention, the color difference of the a channel in CIE-Lab color space is used for opacity parameter extraction. In another preferred embodiment of the invention, the color difference of the g channel in RGB color space is used for opacity parameter extraction. FIG. 6(A) shows the difference of the two images in the G channel in RGB space and FIG. 6(B) shows the differences of the two images in the a channel in CIE-Lab space. Generally speaking, however, the image could be transformed to any color space.

Because immature metaplasia and columnar epithelium tissue turns transiently white after acetic acid application but do not exhibit dysplastic tissue changes, they should not be excluded from the acetowhite region of interest. These tissue regions usually exhibit a minor opacity change. Therefore the present invention applies a two-step mean shift clustering algorithm in the color difference feature space. The first step is to segment the dominant opacity change and to remove minor opacity change. The second step is to segment the most opaque change from the foreground region obtained in the first step. An opacity parameter is computed as the mean color difference of the most opaque region. The most opaque region is defined as the region with the largest mean color difference. The opacity parameter is expressed by the following formula:

$$\text{Opacity} = \frac{1}{(2^n-1)\Omega}\left[\sum_{i,j}(f_k^*(i,j) - g_k(i,j))^p * r(i,j)\right]^{\frac{1}{p}} \quad (8)$$

where n is the number of bits of the image, $f_k$ is the registered pre-acetic acid image, and $g_k$ is the selected post acetic acid image, both at k band (k=1, 2, 3). The symbol r is the most opaque region extracted from the clustering algorithm in binary form. The symbol $\Omega$ is the number of foreground pixels in the opaque region r. The p norm metric is used in the equation. In the current implementation, p is set to 1, and the a band CIE-Lab color space is used.

The final acetowhite epithelium is obtained by grouping the acetowhite color regions with similar opacity values. The post processing step is used to obtain more accurate lesion boundaries using the spatial information from the color analysis.

FIG. 7(A)(1) and FIG. 7(A)(2) are both results of the opacity analysis. FIG. 7(A)(1) shows the most opaque white lesion and FIG. 7(A)(2) shows the intermediate opaque white lesion. FIG. 7(B)(1) and FIG. 7(B)(2) are the results of final acetowhite epithelium detection. FIG. 7(B)(1) depicts the first level of acetowhite region and FIG. 7(B)(2) depicts the second level of acetowhite region. FIG. 7(C)(1) shows the colposcopist's image annotation of the opaque white lesion (the bright areas) and FIG. 7(C)(2) shows the colposcopist's image annotation of the intermediate opaque white lesion (the bright areas). FIG. 7(D)(1) and FIG. 7(D)(2) are histological maps of the cervical images. Histological maps are presented as projected lines on a colposcopic image due to the tissue specimen processing procedure. (D. G. Ferris, J. T. Cox, D. M. O'Connor, V. C. Wright, and J. Foerster, *Modern Colposcopy. Textbook and Atlas*, pp. 35-37, American Society for Colposcopy and Cervical Pathology, 2004, incorporated herein by reference) At clinic, tissue is cut using a loop excision. The specimen is put in formalin and shipped to histological lab. In the histological lab, the specimen is cut into serial blocks, a procedure known as "bread-loafing", from which one section is cut and put on a microscope slide. The slides are digitized using a slide scanner. The digitized slides are annotated by pathologist as LISL (low-grade squamous intraepithelial lesion) and HSIL (high-grade squamous intraepithelial lesion). When the slides are mapped back to a cervical picture on where it is cut, they become straight horizontal lines. The bright lines in FIG. 7(D)(1) denote HSIL (high-grade squamous intraepithelial lesion) and the lines in FIG. 7(D)(2) denote LSIL (low-grade squamous intraepithelial lesion).

Figure 8:
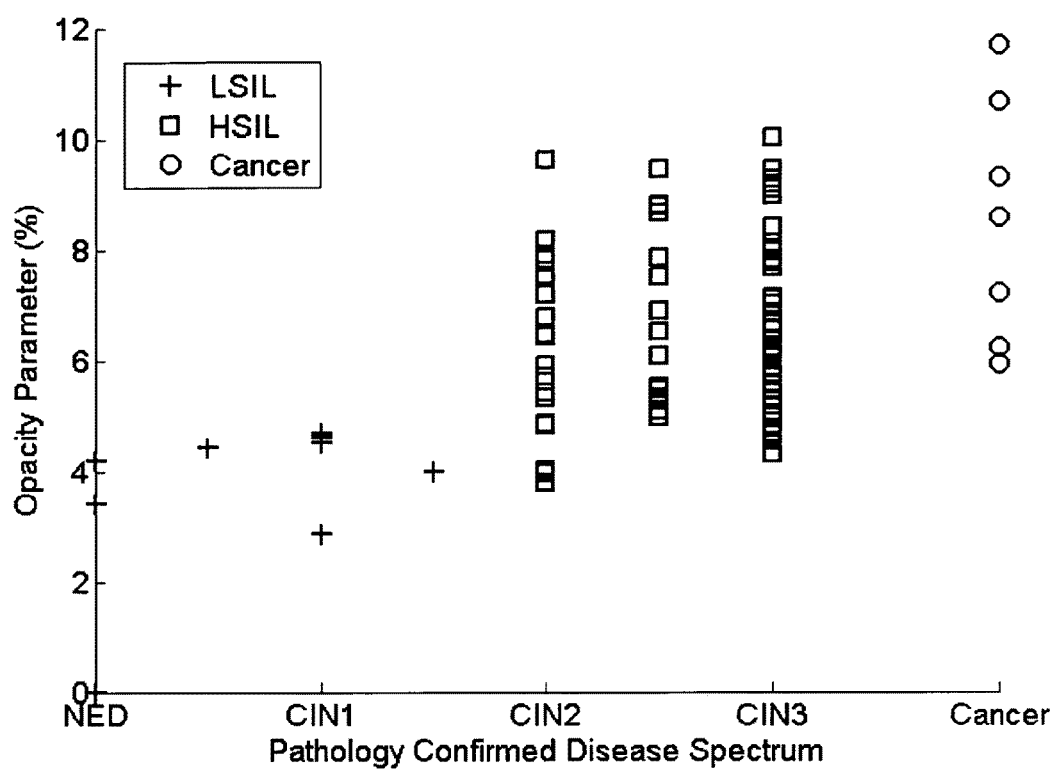
FIG. 8 indicates the correlation between disease and the opacity parameters extracted from cervical images using 96 human subjects.

FIG. 8 indicates the correlation between disease and the opacity parameters extracted from cervical images using 96 human subjects. In FIG. 8, '+' indicates normal or low grade lesions including NED (No Evidence of Disease), HPV subclinical change, and CIN1, CIN12 lesions, '☐' indicates high grade lesions including CIN2, CIN23 and CIN3 lesions, and 'o' indicates microinvasive or invasive cancer. From the figure, the normal and low-grade lesions indicated by '+' all have opacity parameter lower than 5%. A majority of high grade precancerous lesions and cancer indicated by "☐" and 'o' has opacity parameter higher than 5%. In cervical cancer diagnosis, it is important to distinguish high-grade precancerous lesions (HSIL, micro invasion) from low-grade precancerous lesions and normal cases. The reason is that for high-grade lesions, the patient needs immediate treatment while for low-grade lesions the patient does not need immediate treatment. From this figure, a straight line at around 5% opacity parameter can be drawn and used to distinguish/separate high-grade lesions from low-grade and normal patients. The 5% cut-off threshold could be adjusted by using a larger training data set.

While the present invention has been particularly shown and described with reference to embodiments described in the detailed description and illustrated in the figures, it will be understood by one skilled in the art that various changes in detail may be effected therein without departing from the spirit and scope of the invention, as defined by the claims. Accordingly, no limitations are to be implied or inferred except as explicitly set forth in the claims.

INDUSTRIAL APPLICABILITY

The methods of the present invention may also be suitable for image quality assessment for other tissue diagnosis, such as colorectal cancer and skin cancer, and could be used for telemedicine applications. They may also be combined with other instruments and methods for systems that automatically analyze and adjust the quality of acquired images.

What is claimed is:

1. A method for differentiating lesions from surrounding tissue comprising:
    applying acetic acid to epithelial cells to produce acetowhite regions;
    taking at least one post acetic acid image of said acetowhite regions using a digital imager;
    detecting a cervix region, an os region and a columnar epithelium region in an anatomic region of interest in said post acetic acid image, wherein said columnar epithelium region is detected using only color information;
    extracting texture information from a first portion of said anatomic region of interest in said post acetic acid image that excludes said os region and said columnar epithelium region, to define a texture region;
    extracting color information from a second portion of said anatomic region of interest in said post acetic acid image that excludes said os region, said columnar epithelium region, and said texture region, to define a color region; and
    combining said texture region and said color region to create candidate acetowhite regions.

2. A method for differentiating lesions from surrounding tissue comprising:
    obtaining at least one pre acetic acid image of epithelial cells;
    applying acetic acid to said epithelial cells to produce acetowhite regions;
    taking at least one post acetic acid image of said acetowhite regions;
    registering one of said pre acetic acid images and one of said post acetic acid images to form registered images of said acetowhite regions; and
    extracting an opacity parameter from said registered images of said acetowhite regions.

3. A method for differentiating lesions from surrounding tissue comprising:
    obtaining at least one pre acetic acid image of epithelial cells;
    applying acetic acid to said epithelial cells to produce acetowhite regions;
    taking at least one post acetic acid image of said acetowhite regions;
    registering one of said pre acetic acid images and one of said post acetic acid images to form registered images of said acetowhite regions; and
    extracting an opacity parameter from said registered images of said acetowhite regions;
    wherein said registered images of said acetowhite regions are color images having color values for each of several color channels in a color space, and wherein said extracting step comprises clustering the differences of temporal changes in said color values between said registered images of said acetowhite region.

4. A method for differentiating lesions from surrounding tissue comprising:
    obtaining at least one pre acetic acid image of epithelial cells;
    applying acetic acid to said epithelial cells to produce acetowhite regions;
    taking at least one post acetic acid image of said acetowhite regions using a digital imager;
    detecting an anatomic region of interest in said post acetic acid image;

extracting texture information from said anatomic region of interest in said post acetic acid image to define texture regions;
extracting color information from said anatomic region of interest in said post acetic acid image to define color regions;
combining said texture regions and said color regions to create candidate acetowhite regions;
registering one of said pre acetic acid images and one of said post acetic acid images to form registered images of said acetowhite regions; and
extracting an opacity parameter from said registered images of said acetowhite regions, whereby said opacity parameter provides high predictive value for lesion diagnosis.

5. A method for differentiating lesions from surrounding tissue comprising:
obtaining at least one pre acetic acid image of epithelial cells;
applying acetic acid to said epithelial cells to produce acetowhite regions;
taking at least one post acetic acid image of said acetowhite regions using a digital imager;
detecting an anatomic region of interest in said post acetic acid image;
extracting texture information from said anatomic region of interest in said post acetic acid image to define texture regions;
extracting color information from said anatomic region of interest in said post acetic acid image to define color regions;
combining said texture regions and said color regions to create candidate acetowhite regions;
registering one of said pre acetic acid images and one of said post acetic acid images to form registered images of said acetowhite regions; and
extracting an opacity parameter from said registered images of said acetowhite regions, whereby said opacity parameter provides high predictive value for lesion diagnosis;
wherein said pre-acetic acid image and said post-acetic acid image forming said registered images of said acetowhite regions are color images having color values for each of several color channels in a color space, and wherein said extracting said opacity parameter step comprises clustering the differences of temporal changes in said color values between said registered images of said acetowhite region.

6. A method according to any one of claims 1, 4 or 5, further comprising calibrating said digital imager before obtaining said pre-acetic acid images and said post-acetic acid images to ensure that images acquired at different times and with different imagers exhibit identical intensity and color values, independent of camera, camera settings and light source used.

7. A method according to any one of claims 2, 3, 4 or 5 wherein said extracting an opacity parameter step is performed by using ratio imaging in said color space.

8. A method according to any one of claims 2, 3, 4 or 5, wherein said pre-acetic acid image of epithelial cells and said post-acetic acid image of said acetowhite regions are color images having color values for each of several color channels in a color space that is approximately perceptually uniform.

9. A method according to any one of claims 4 and 5 further comprising obtaining final acetowhite lesions or epithelial cells by grouping said candidate acetowhite regions using said opacity parameter.

10. A method of image processing for use in differentiating lesions from surrounding tissue, comprising:
obtaining at least one pre acetic acid image of epithelial cells;
applying acetic acid to said epithelial cells to produce acetowhite regions;
taking at least one post acetic acid image of said acetowhite regions;
registering one of said pre acetic acid images and one of said post acetic acid images to form a registered pre acetic acid image and a registered post acetic acid image;
subtracting said registered pre acetic acid image from said registered post acetic acid image to provide a difference image; and
extracting temporal changes of lesions or epithelial cells from said difference image.

11. A method according to claim 10, wherein said subtracting step to provide a difference image is performed in an approximately perceptually uniform color space.

12. A method according to claim 11, wherein said subtracting step is performed in the a channel of CIE-Lab space.

13. A method according to claim 10, wherein said registered pre-acetic acid image and said registered post-acetic acid image are color images having color values for each of several color channels in a color space, and wherein said extracting step comprises clustering the differences of said color values in said temporal changes.

14. A method of image processing for use in differentiating lesions from surrounding tissue, the method comprising:
obtaining at least one pre acetic acid image of epithelial cells;
applying acetic acid to said epithelial cells to produce acetowhite regions;
taking at least one post acetic acid image of said acetowhite regions using a digital imager;
registering one of said pre acetic acid images and one of said post acetic acid images to form a registered pre acetic acid image and a registered post acetic acid image; and
subtracting said registered pre acetic acid image from said registered post acetic acid image to provide a difference image; and
extracting temporal changes of lesions or epithelial cells from said difference image;
wherein said registered pre-acetic acid image and said registered post-acetic acid image are color images having color values for each of several color channels in a color space, and wherein said subtracting step comprises clustering the differences of said color values in said temporal changes.

15. A method according to claim 14, wherein said color space is an approximately perceptually uniform color space.

16. A method according to claim 15, wherein said subtracting step is performed in the a channel of CIE-Lab space.

17. A method for differentiating lesions from surrounding tissue comprising:
obtaining at least one pre acetic acid image of epithelial cells;
applying acetic acid to said epithelial cells to produce acetowhite regions;
taking at least one post acetic acid image of said acetowhite regions;
detecting an anatomic region of interest in said post acetic acid image;
extracting texture information from said anatomic region of interest in said post acetic acid image to define texture regions;

extracting color information from said anatomic region of interest in said post acetic acid image to define color regions;

combining said texture regions and said color regions to create candidate acetowhite regions;

registering one of said pre acetic acid images and one of said post acetic acid images to form a registered pre acetic acid image of said acetowhite regions and a registered post acetic acid image of said acetowhite regions; and subtracting said registered pre acetic acid image from said registered post acetic acid image to provide a difference image; and extracting temporal changes of lesions or epithelial cells from said difference image.

18. A method according to claim 17, wherein said subtracting step to provide a difference image is performed in an approximately perceptually uniform color space.

19. A method according to claim 18, wherein said subtracting step is performed in the a channel of CIE-Lab space.

20. A method according to claim 17, wherein said registered pre-acetic acid image and said registered post-acetic acid image are color images having color values for each of several color channels in a color space, and wherein said extracting step comprises clustering the differences of said color values in said temporal changes.

21. A method for differentiating lesions from surrounding tissue comprising:

obtaining at least one pre acetic acid image of epithelial cells;

applying acetic acid to said epithelial cells to produce acetowhite regions;

taking at least one post acetic acid image of said acetowhite regions using a digital imager;

detecting an anatomic region of interest in said post acetic acid image;

extracting texture information from said anatomic region of interest in said post acetic acid image to define texture regions;

extracting color information from said anatomic region of interest in said post acetic acid image to define color regions;

combining said texture regions and said color regions to create candidate acetowhite regions;

registering one of said pre acetic acid images and one of said post acetic acid images to form a registered pre acetic acid image and a registered post acetic acid image; and subtracting said registered pre acetic acid image from said registered post acetic acid image to provide a difference image; and extracting temporal changes of lesions or epithelial cells from said difference image;

wherein said pre-acetic acid image and said post-acetic acid image forming said registered images of said acetowhite regions are color images having color values for each of several color channels in a color space, and wherein said subtracting step comprises clustering the differences of said temporal changes in said color values.

22. A method according to claim 21, wherein said subtracting step to provide a difference image is performed in an approximately perceptually uniform color space.

23. A method according to claim 22, wherein said subtracting step is performed in the a channel of CIE-Lab space.

24. A method according to any one of claims 17 and 21 further comprising obtaining final acetowhite lesions or epithelial cells by grouping said candidate acetowhite regions with said extracted temporal changes of lesions or epithelial cells.

* * * * *